(12) United States Patent
Lian

(10) Patent No.: US 6,193,197 B1
(45) Date of Patent: Feb. 27, 2001

(54) MULTIPURPOSE SUCTION-TYPE CONNECTION SEAT

(76) Inventor: Bing-Tson Lian, P.O. Box 453, Taichung (TW)

( * ) Notice: Subject to any disclaimer, the term of this patent is extended or adjusted under 35 U.S.C. 154(b) by 0 days.

(21) Appl. No.: 09/472,426

(22) Filed: Dec. 27, 1999

(51) Int. Cl.⁷ .................................................. F16B 47/00
(52) U.S. Cl. ...................................... 248/206.2; 248/309.3
(58) Field of Search .......................... 248/205.5, 206.2, 248/309.3, 363, 467, 683, 205.6, 205.8; 211/88.04

(56) References Cited

U.S. PATENT DOCUMENTS

| | | | |
|---|---|---|---|
| 952,495 | * | 3/1910 | Austin ................................ 248/205.8 |
| 2,145,142 | * | 1/1939 | Stout ................................ 248/205.5 |
| 5,193,776 | * | 3/1993 | Nagai et al. ........................ 248/295.1 |
| 5,495,884 | * | 3/1996 | Shikler ................................ 160/120 |
| 5,611,511 | * | 3/1997 | Lee ..................................... 248/205.8 |

* cited by examiner

*Primary Examiner*—Ramon O Ramirez
*Assistant Examiner*—Jon A Szumny

(57) ABSTRACT

A suction-type connection seat is designed to be attached to a surface or wall and is composed of a suction cup, a shield, a lower locating ring, a threaded bar, an upper locating ring, a connection rod, and a fastening ring. The connection rod is pivoted with the threaded bar and is provided with two arresting blocks which are jutted out of the threaded bar via the two cuts of the slot wall of the threaded bar. The lower locating ring has a plurality of protrusions, with each having a through hole for holding one end of a cord which is intended to locate further the connection seat. The arresting blocks of the connection rod serve to prevent the connection rod from turning in relation to the threaded bar.

1 Claim, 4 Drawing Sheets

MULTIPURPOSE SUCTION-TYPE CONNECTION SEAT

FIELD OF THE INVENTION

The present invention relates generally to a connection seat, and more particularly to a connection seat provided with a suction cup that will stick to a surface by creating a vacuum in the surface area it covers.

BACKGROUND OF THE INVENTION

The conventional connection seat is fastened with a surface or wall by a plurality of nails. The fastening of the connection seat is thus time-consuming. In addition, the nails that are fastened onto the surface or wall are destructive to the structural integrity of the surface or wall. The conventional connection seat is widely used to attach a towel rack and the like to the wall.

SUMMARY OF THE INVENTION

The primary objective of the present invention is to provide a multipurpose suction-type connection seat which can be easily attached to a surface or wall without causing a structural damage to the surface or wall.

It is another objective of the present invention to provide a multipurpose suction-type connection seat which can be detached with ease and speed from a surface or wall to which it is attached.

The objectives, features, and functions of the present invention will be readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
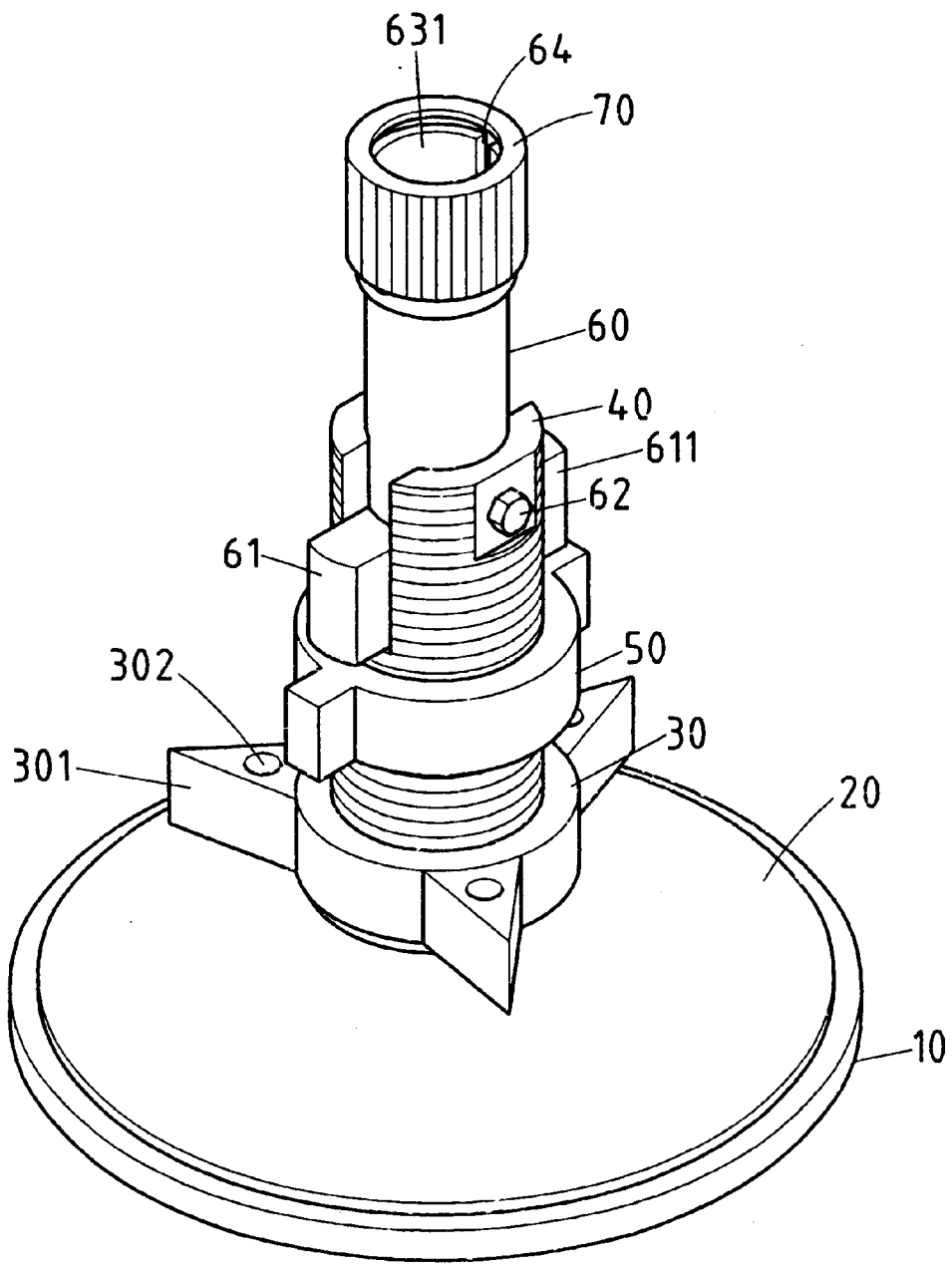
FIG. 1 shows a perspective view of the preferred embodiment of the present invention.
Figure 2:
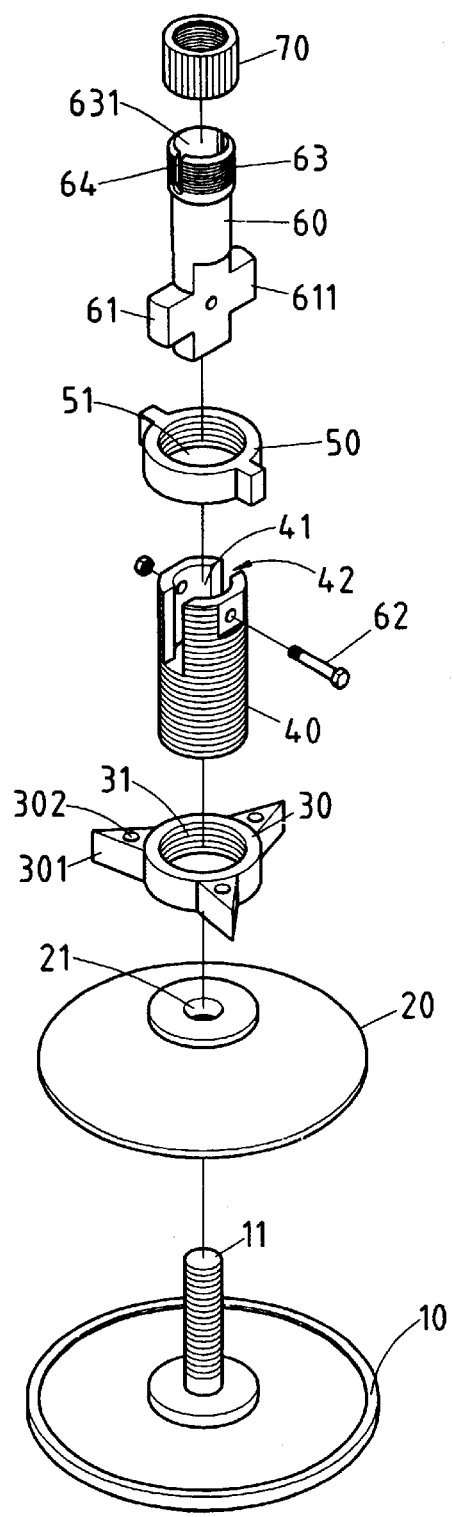
FIG. 2 shows an exploded view of the preferred embodiment of the present invention.
Figure 3:
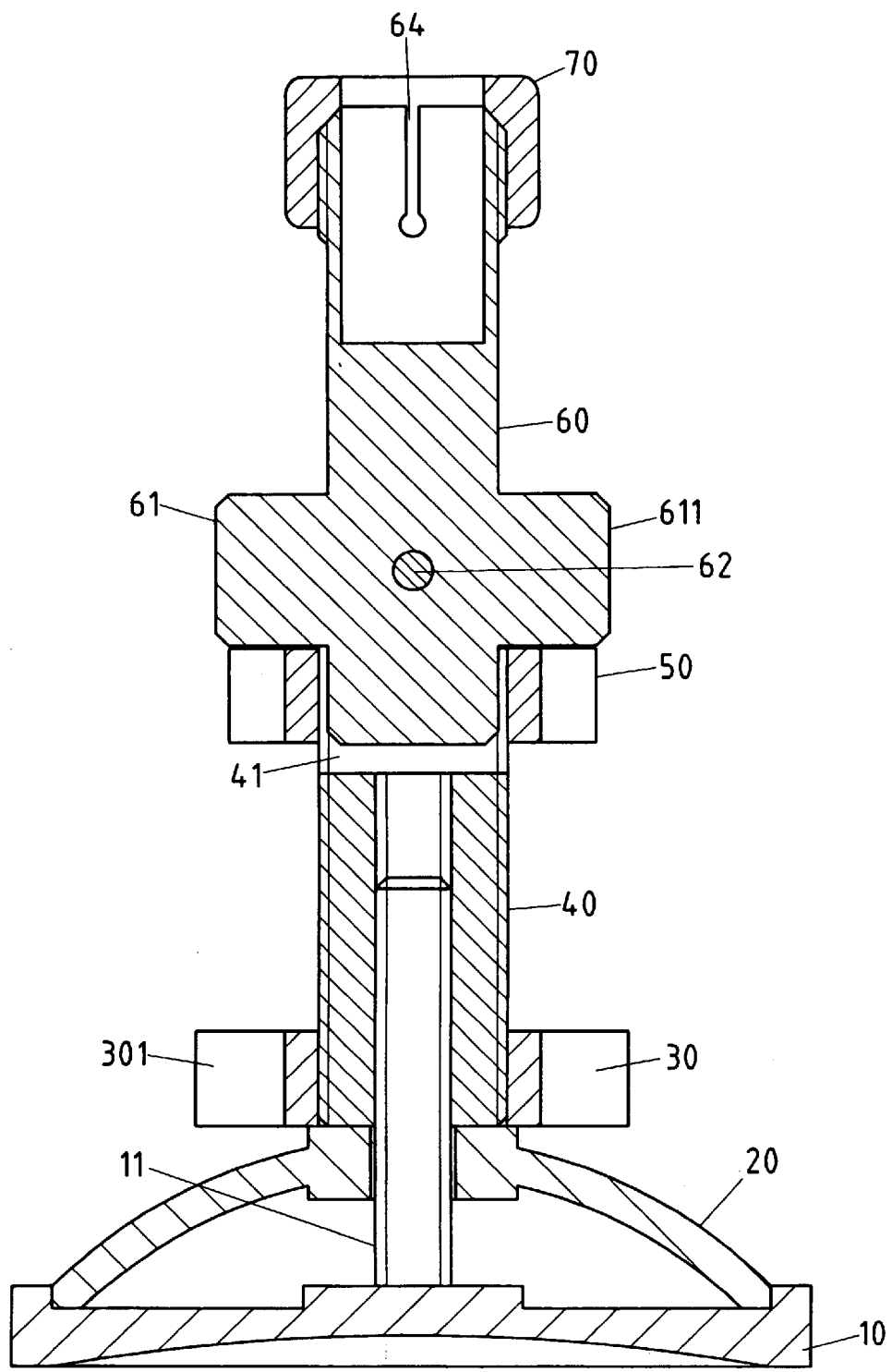
FIG. 3 shows a longitudinal sectional view of the preferred embodiment of the present invention in combination.

As shown in FIGS. 1–4, a suction-type connection seat embodied in the present invention is formed of the component parts which are described hereinafter.

A suction cup 10 is provided in the upper surface thereof with an upright threaded rod 11 fastened therewith.

A shield 20 is provided with a through hole 21 and is joined with the upper surface of the suction cup 10 such that the threaded rod 11 of the suction cup 10 is put through the through hole 21 of the shield 20.

A lower locating ring 30 is provided with a threaded hole 31 and three protrusions 301, with each extending from the outer wall of the lower locating ring 30 and having a through hole 302 parallel to the threaded hole 31. The lower locating ring 30 is disposed on the shield 20.

A threaded bar 40 is engaged at the lower end thereof with the threaded hole 31 of the lower locating ring 30 such that an inner threaded hole (not shown in the drawings) of the threaded bar 40 is engaged with the upright threaded rod 11 of the suction cup 10. The threaded bar 40 is provided at the top end thereof with a slot 41 extending in the direction of the longitudinal axis of the threaded bar 40. The slot 41 has a depth and a wall which is provided with two through holes (not labeled) opposite to each other and two cuts 42 opposite to each other.

An upper locating ring 50 is provided with a threaded hole 51, which is engaged with the threaded bar 40.

A connection rod 60 is provided at the bottom end thereof with a first arresting block 61 extending therefrom, a second arresting block 611 extending therefrom and in alignment with the first arresting block 61, and a through hole (not labeled). The connection rod 60 is pivoted with the threaded bar 40 by a pivot 62 which is received in the through holes of the slot 41 of the threaded bar 40 and the through hole of the bottom end of the connection rod 60. The first arresting block 61 and the second arresting block 611 of the connection rod 60 are jutted out of the threaded bar 40 via the cuts 42 of the slot 41 of the threaded bar 40. The connection rod 60 is further provided at the top end thereof with outer threads 63, a fitting hole 631, and a notch 64.

A fastening ring 70 is provided with inner threads and is fastened with the top end of the connection rod 60 such that the inner threads of the fastening ring 70 are engaged with the outer threads 63 of the connection rod 60.

Figure 4:
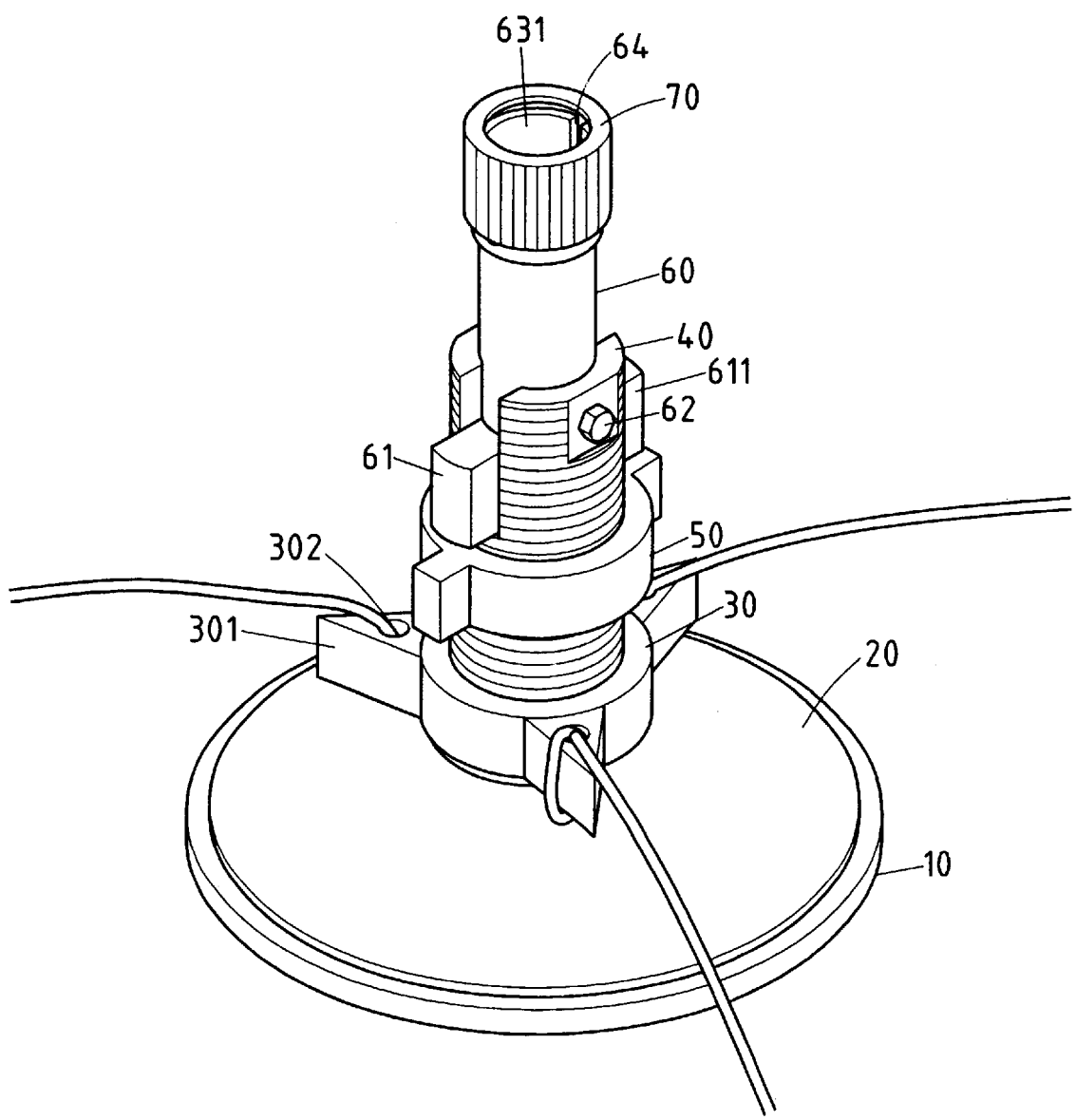
FIG. 4 shows a perspective view of the preferred embodiment of the present invention in conjunction with a plurality of locating cords.

As shown in FIG. 4, the connection seat of the present invention is further located by a plurality of cords 5, which are secured at one end thereof in the through hole 302 of the protrusions 301 of the lower locating ring 30. The connection rod 60 is further located by the two arresting blocks 61 and 611 thereof, which are securely received in place in the two cuts 42 of the slot 41 of the threaded bar 40.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A suction-type connection seat comprising:

a suction cup attached to a surface or wall and provided in an upper surface thereof with an upright threaded rod fastened therewith;

a shield provided with a through hole and joined with the upper surface of said suction cup such that said upright threaded rod of said suction cup is put through said through hole of said shield;

a threaded bar provided at a lower end thereof with an inner threaded hole and engaged at the lower end thereof with said threaded hole of said lower locating ring such that said inner threaded hole of said threaded bar is engaged with said upright threaded rod of said suction cup, said threaded bar further provided at a top end thereof with a slot of a depth whereby said slot is provided in a wall thereof with two through holes opposite to each other and two cuts opposite to each other;

an upper locating ring provided with a threaded hole whereby said threaded hole is engaged with said threaded bar;

a connection rod provided at a bottom end thereof with a through hole and pivoted with said threaded bar by a pivot which is received in said two through holes of said wall of said slot of said threaded bar and said through hole of the bottom end of said connection rod, said connection rod further provided at a top end thereof with outer threads, a hole, and a notch; and a fastening ring provided with inner threads and fastened with the top end of said connection rod such that said inner threads of said fastening ring are engaged with said outer threads of said connection rod;

wherein said lower locating ring has a plurality of protrusions, with each extending from the outer wall of said lower locating ring and having a through hole parallel to said threaded hole of said lower locating ring whereby said through hole of said protrusions is used to fasten one end of a cord;

wherein said connection rod is provided at the bottom end thereof with two arresting blocks opposite to each other whereby said two arresting blocks are jutted out of said threaded bar via said two cuts of said slot of said threaded bar.

* * * * *